United States Patent [19]

Dunnavant et al.

[11] Patent Number: 4,683,252

[45] Date of Patent: Jul. 28, 1987

[54] PHENOLIC RESIN-POLYISOCYANATE BINDER SYSTEMS CONTAINING AN ORGANOHALOPHOSPHATE AND USE THEREOF

[75] Inventors: William R. Dunnavant, Columbus; Robert B. Fechter; John J. Gardikes, both of Worthington; Heimo J. Langer, Columbus, all of Ohio

[73] Assignee: Ashland Oil, Inc., Ashland, Ky.

[21] Appl. No.: 832,687

[22] Filed: Feb. 25, 1986

[51] Int. Cl.[4] .................................................. C08K 5/51
[52] U.S. Cl. .................................... 523/143; 524/121; 524/149; 524/136
[58] Field of Search ................ 523/142, 143; 524/121, 524/149, 136

[56] References Cited

U.S. PATENT DOCUMENTS

| | | | |
|---|---|---|---|
| 4,266,266 | 12/1982 | Mitsopoulos et al. | 523/143 |
| 4,311,620 | 1/1982 | Sherwood et al. | 523/143 |
| 4,436,881 | 3/1984 | Laitar | 524/115 |
| 4,540,724 | 9/1985 | Dunnavant et al. | 523/143 |
| 4,602,069 | 7/1986 | Dunnavant et al. | 523/143 |

*Primary Examiner*—Lewis T. Jacobs
*Attorney, Agent, or Firm*—Pollock, Vande Sande & Priddy

[57] ABSTRACT

A binder containing a phenolic resin, a polyisocyanate, and an organohalophosphate and use thereof.

13 Claims, No Drawings

PHENOLIC RESIN-POLYISOCYANATE BINDER SYSTEMS CONTAINING AN ORGANOHALOPHOSPHATE AND USE THEREOF

DESCRIPTION

1. Technical Field

The present invention relates to binder compositions, methods for curing such binder compositions, and use thereof. The binder compositions of the present invention are especially useful as molding compositions such as refractories, abrasive articles, and molding shapes such as cores and molds. The preferred binder compositions of the present invention are especially useful in obtaining aggregate-binder compositions that exhibit improved bench life. The binder compositions are capable of being cured at room temperature by a gaseous curing agent.

2. Background Art

U.S. Pat. Nos. 3,409,579 and 3,676,392 disclose binder compositions made available as two-package systems comprising a resin component in one package and a hardener component in the other package. The resin component comprises an organic solvent solution of a phenolic resin. The hardener component comprises a liquid polyisocyanate having at least two isocyanate groups per molecule. At the same time the contents of the two packages are combined and then mixed with the sand aggregate or preferably the packages are sequentially admixed with sand aggregate. After a uniform distribution of the binder on the sand particles has been obtained, the resulting foundry mix is molded into the desired shape. In U.S. Pat. No. 3,409,579 the molded shape is cured by passing a gaseous tertiary amine through it. In U.S. Pat. No. 3,676,392 curing is effected by means of a base having a pKb value in the range of about 7 to about 11 as determined by a method described by D. D. Perrin in "Dissociation Constants of Organic Bases in Aqueous Solution", Butterworths, London, 1965. The base is introduced originally into the resin component before it is mixed with hardener, or it may be introduced as the third component of a three-package binder system comprising in separate packages the resin component, the hardener, and the base.

In both U.S. Pat. Nos. 3,409,579 and 3,676,392 the preferred phenolic resins and benzylic ether resins. These are the condensation products of a phenol having the general formula:

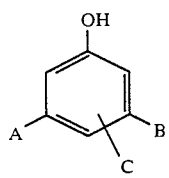

wherein A, B, and C are hydrogen, hydrocarbon radicals, oxyhydrocarbon radicals, or halogen with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. No. 3,485,797.

The phenolic resin component of the binder composition is, as indicated above, generally employed as a solution in an organic solvent.

The second component or package of the binder composition comprises an aliphatic, cycloaliphatic, or aromatic polyisocyanate having preferably from 2 to 5 isocyanate groups. If desired, mixtures of polyisocyanates can be employed. Isocyanate prepolymers formed by reacting excess polyisocyanate with a polyhydric alcohol (e.g., a prepolymer of toluene diisocyanate and ethylene glycol) can be employed.

Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolypehnyl isocyanates, chlorophenylene-2, 4-diisocyanate, and the like. The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

In order to extend the bench life of the above binder systems before being combined with the catalytic component various materials have been suggested. One material currently being commercially employed for such purpose is phthaloyl chloride. However, it is not entirely satisfactory. The bench life can be defined as the maximum permissible time delay between mixing the binder components together in sand and the production of acceptable products therefrom. Other bench life extenders are suggested in U.S. Pat. Nos. 4,436,881; 4,514,316; and 4,540,724. In particular, U.S. Pat. Nos. 4,436,881 and 4,514,316 discuss the use of certain dichloroarylphosphines, chlorodiarylphosphines, arylphosphonic dichlorides, and diarylphosphinyl chlorides for such purposes. U.S. Pat. No. 4,540,724 discloses the use of inorganic phosphorus halides and of certain organic phosphorus halides and especially phenyl phosphonic dichloride and benzene phosphorus dichloride as bench life extenders.

DESCRIPTION OF INVENTION

The bench life of the molding compositions is extended according to the present invention by employing organohalophosphates. In addition, the compositions exhibit satisfactory strength characteristics.

The present invention is concerned with a binder composition which comprises a resin component, a hardener component, a curing component, and an organohalophosphate. The resin component includes a non-aqueous phenolic resin which comprises a condensation product of a phenol with an aldehyde. For instance, the phenol can be represented by the formula:

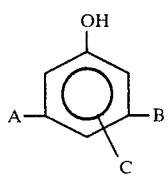

wherein A, B, and C are hydrogen, or hydroxyl, or hydrocarbon radicals, or halogen, or combinations thereof.

The aldehyde has the formula R'CHO wherein R' is a hydrogen or hydrocarbon radical of 1 to 8 carbon atoms. The hardener component comprises liquid polyisocyanate containing at least two isocyanate groups.

The present invention is also concerned with molding compositions which comprise a major amount of aggregate and an effective bonding amount up to about 40% by weight of the aggregate of the binder composition described hereinabove.

Moreover, the present invention is concerned with fabricating foundry shapes which comprises mixing foundry aggregate with a bonding amount of up to about 10% by weight based upon the weight of the aggregate of the binder composition described hereinabove. The foundry mix is introduced in a pattern and hardened to become self-supporting. The shaped foundry mix is removed from the pattern and allowed to further cure to thereby obtain a hard, solid, cured foundry shape.

Furthermore, the present invention is concerned with a process for casting a metal. The process comprises fabricating a foundry shape as discussed hereinabove and pouring the metal while in the liquid or molten state into or around the shape. The metal is allowed to cool and solidify and is then separated from the molded article.

BEST AND VARIOUS MODES FOR CARRYING OUT THE INVENTION

The organohalophosphates employed according to the present invention are represented by the following structural formulae:

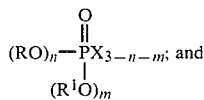

n is 0 or 1; m is 0 or 1 provided that at least one of n or m is 1; and n+m is 1 or 2;

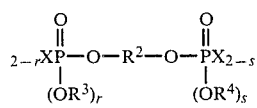

r is 0 or 1 and s is 0 or 1; and wherein each R and $R^1$ in formula I individually is alkyl, aralkyl, aryl, or alkaryl or interconnected with each other to form an arylene group, an alkylene group, or a cycloalkylene group.

Each $R^3$ and $R^4$ in formula II individually is alkyl, aralkyl, aryl, or alkaryl.

$R^2$ in formula II is alkylene, alkylidene, cycloalkylene, or arylene.

The alkyl groups (R, $R^1$, $R^3$, and $R^4$) usually has from 1 to 22 carbon atoms and preferably from 1 to 6 carbon atoms and includes methyl, ethyl, propyl, and butyl.

The aryl groups (R, $R^1$, $R^3$, and $R^4$) usually contain 6 to 14 carbon atoms. Examples of some aryl groups are phenyl and naphthyl.

The aralkyl group and alkaryl groups (R, $R^1$, $R^3$, and $R^4$) usually include 6 to 14 carbon atoms in the aryl portion and about 1 to 22 carbon atoms in the alkyl portion and preferably about 1 to 6 carbon atoms in the alkyl portion.

The alkyl, aryl, alkaryl, and aralkyl groups can be substituted with halogen atoms, if desired.

When $R^1$ and R in formula I are interconnected to form an arylene group such group usually contains 6 to 14 carbon atoms and includes phenylene, naphthalene, and biphenylene.

When $R^1$ and R in Formula I are interconnected to form an alkylene group such group usually contains two to four carbon atoms such as ethylene, propylene, and butylene.

When $R^1$ and R in formula I are interconnected to form a cycloalkylene group such group usually includes 5 or 6 carbon atoms such as cyclohexylene and cyclopentylene.

The arylene groups ($R^2$) in formula II usually contain 6 to 14 carbon atoms such as phenylene, naphthalene, and biphenylene.

The alkylene and alkylidene groups ($R^2$) in formula II usually contain 1 to about 6 carbon atoms and include methylene, ethylene, ethylidene, propylene, propylidene, butylene, and neopentylene.

The cycloalkylene group $R^2$ in formula II usually contains 5 or 6 carbon atoms and includes cyclopentylene and cyclohexylene.

The arylene groups, alkylene groups, alkylidene groups, and cycloalkylene groups can be substituted with halogen atoms, if desired.

X in the above formula is a halo group, preferably Cl. or Br and most preferably Cl.

Examples of some specific organohalophosphates are

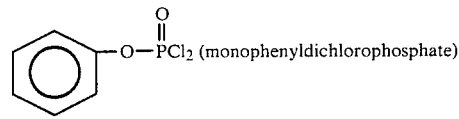

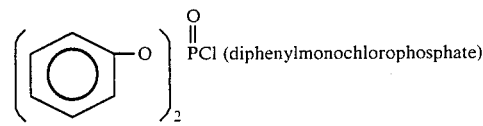

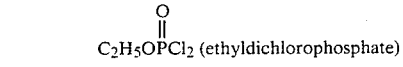

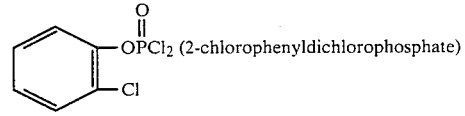

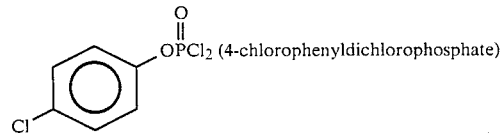

-continued

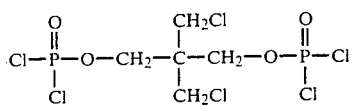

2,2-bis(chloromethyl)-1,3-propylene
bis(dichlorophosphate)

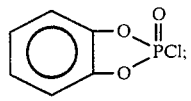

1,2-phenylene phosphorochloridate

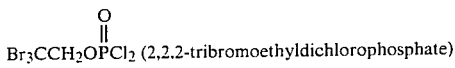

The amount of organohalophosphates employed is usually about 0.05% to about 5% based upon the weight of the binder composition and preferably about 0.1% to about 5% based upon the weight of the binder.

The binder compositions which are benefited by use of this invention are known to the art and are those which contain certain phenolic resin and polyisocyanate combinations.

Such phenolic/isocyanate binder systems are admixed at or about the time of use in the presence of sand.

Typically, the reactive ingredients of such binder compositions are sold, shipped, and stored in separate packages (i.e., a multiple package core binder) to avoid undesirable deterioration due to premature reaction between the components. Solvents, catalysts, various additives, and other known binders can optionally be used in conjunction with these essential ingredients (i.e., used with the phenolic resin and the isocyanate).

The phenol resin component includes a phenolic resin which comprises reaction products of a phenol with an The phenol resin component includes a phenolic resin which comprises reaction products of a phenol with an aldehyde.

The phenol can be represented by the general formula:

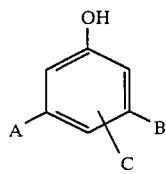

wherein A, B, and C are hydrogen atoms, or hydroxyl radicals, or hydrocarbon radicals or oxyhydrocarbon radicals, or halogen atoms, or combinations of these.

This phenol may be a multiple ring phenol such as bisphenol A. The phenolic resin is preferably non-aqueous. By "non-aqueous" is meant a phenolic resin which contains water in amounts of no more than about 10%, preferably no more than about 5%, and more preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are substantially free of water and are organic solvent soluble. The phenolic component includes any one or more of the phenols which have heretofore been employed in the formation of phenolic resins and which are not substituted at either the two ortho-positions or at one ortho-position and the para-position such as unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable. Such phenols can be described by the general formula:

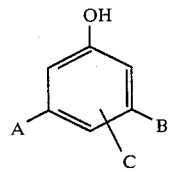

wherein A, B, and C are hydrogen atoms, or hydroxyl radicals, or hydrocarbon radicals, or oxyhydrocarbon radicals, or halogen atoms, or combinations of these.

The phenol component is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

A preferred class of phenolic resins that can be employed in the binder compositions of the present invention is described in U.S. Pat. No. 3,485,797 referred to above. The phenolic resins employed in the binder compositions also can include either resole or A-stage resins or novolak resins when admixed with polyisocyanates and a foundry aggregate and cured by use of catalysts, these resins form cores of sufficient strength and other properties to be suitable in industrial applications. The resole resins are preferred over the novolak resins. The resole or B-stage resins which are a more highly polymerized form of resole resins are generally unsuitable. The phenolic resin employed must be liquid or organic solvent-suitable. Solubility in organic solvent is desirable to achieve uniform distribution of the binder on the aggregate.

The substantial absence of water in the phenolic resin is desirable in view of the reactivity of the binder composition of the present invention with water. Mixtures of phenolic resins can be used.

The phenolic resin component of the binder composition is, as indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution and preferably in the range of 20% to 80%. It is preferred to keep the viscosity of the phenolic component at less than X-1 on the Gardner-Holt Scale.

The second component or package of the binder composition comprises an aliphatic, cycloaliphatic, or aromatic polyisocyanate having preferably from 2 to 5 isocyanate groups. If desired, mixtures of organic polyisocyanates can be employed. Suitable polyisocyanates include the aliphatic polyisocyanates such as 4,4'-dicyclohexylmethane diisocyanate and the dimethyl derivatives thereof. Further examples of suitable polyisocyanates are 1,5-naphthalene diisocyanate, triphenylmethane triisocyanate, xylylene diisocyanate, and the methyl derivatives thereof; polymethylenepolyphenyl isocyanates, chlorophenylene-2,4-diisocyanate, and the like. Mixtures of isocyanates can be used.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution. Most preferably, the isocyanate is employed in a stoichiometric amount ± about 20% based on the available hydroxyl groups of the phenolic resin.

The difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 280° F. to 450° F.

The polar solvents should not be extremely polar such as to become incompatible with the aromatic solvent.

Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

In addition, the compositions can include drying oils such as disclosed in U.S. Pat. No. 4,268,425. Such drying oils include glycerides of fatty acids which contain two or more double bonds whereby oxygen on exposure to air can be absorbed to give peroxides which catalyze the polymerization of the unsaturated portions.

Examples of some natural drying oils include soybean oil, sunflower oil, hemp oil, linseed oil, tung oil, oiticia oil, and fish oils, and dehydrated castor oil, as well as the various known modifications thereof (e.g., the heat bodied, air-blown, or oxygen-blown oils such as blown linseed oil and blown soybean oil). The above discussion concerning the oil is not intended to imply that such actually cure in the present system by air drying, but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil employed in the present invention is linseed oil.

The amount of drying oil employed is generally at least about 2%, preferably about 2% to about 15%, and most preferably about 4% to about 10% by weight based upon the total of the components in the binder composition. The drying oil can be considered part of the solvent component of the composition.

In addition, the solvent component can include liquid dialkyl ester such as dialkyl phthalate of the type disclosed in U.S. Pat. No. 3,905,934. Such preferably have the structure:

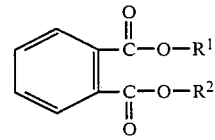

where $R^1$ and $R^2$ are alkyl radicals of 1 to 12 carbon atoms and the total number of carbon atoms in the R groups does not exceed 16. Preferably, $R^1$ and $R^2$ are alkyl radicals of 3 to 6 carbon atoms and the total number of carbon atoms in $R^1$ and $R^2$ is between 6 and 12. Thus, in the above structural formula either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from Du Pont under the trade designation DBE-5; dimethyl adipate, available from Du Pont under the trade designation DBE-6; dimethyl succinate; and mixtures of such esters which are available from Du Pont under the trade designation DBE, and dialkyl adipates and succinates with alcohols up to 12 carbon atoms.

The binder compositions are preferably to be made available as a two-package system with the phenolic resin in one package and the isocyanate component in the other package with the drying oil. Usually, the binder components are combined and then admixed with sand or a similar aggregate to form the molding mix or the mix can also be formed by sequentially admixing the components with the aggregate. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand type foundry shape, the aggregate employed has a particle size large enough to provide sufficient porosity in the foundry shape to permit escape of volatiles from the shape during the casting operation. The term "ordinary sand type foundry shapes", as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 50 and about 150 mesh (Tyler Screen Mesh). The aggregate for foundry shapes preferably has an average particle size between about 50 and about 150 mesh (Tyler Screen Mesh). The preferred aggregate employed for ordinary foundry shapes is silica wherein at least about 70 weight percent and preferably at least about 85 weight percent of the sand is silica. Other suitable aggregate materials include zircon, olivine, aluminosilicate sand, chromite sand, and the like.

When preparing a shape for precision casting, the predominant portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and aluminosilicate sands.

When preparing a refractory such as a ceramic the predominant portion and at least 80 weight percent of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1500° F. which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and the ceramics.

Examples of some abrasive grains for preparing abrasive articles include aluminum oxide, silicon carbide, boron carbide, corundum, garnet, emery, and mixtures thereof.

The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 200 mesh. It is most preferred that at least about 95% of the inorganic filler has an average particle size no greater than 200 mesh. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand type foundry shapes.

In molds and cores for precision casting applications the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to abou 1 weight percent based on the weight of the sand can be tolerated. This is particularly true if the solvent employed is non-water-miscible or if an excess of the polyisocyanate necessary for curing is employed since such excess polyisocyanate will react with the water.

The molding mix is molded into the desired shape, whereupon it can be cured. Curing can be affected by passing a tertiary amine through the molded mix as described in U.S. Pat. No. 3,409,579.

A valuable additive to the binder compositions of the present invention in certain types of sand is a silane such as those having the general formula:

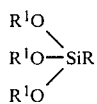

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1% to 2%, based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

In order to further understand the present invention, the following non-limiting examples concerned with foundry are provided. All parts are by weight, unless the contrary is stated. In all examples the foundry samples are cured by the so-called "cold-box" process by contacting with dimethylethylamine.

EXAMPLE 1

100 parts by weight of Manley 1L-5W sand are admixed with about 0.825 parts of a phenolic resin composition, commercially available from Ashland Chemical under the trade designation Isocure ® I 308 which contains about 48% by weight of a phenolic resole benzylic ether and about 52% by weight of a solvent mixture of aromatic hydrocarbon, kerosene, ester, and release agent. To the mixture are admixed about 0.008 parts of monophenyldichlorophosphate and about 0.675 parts of isocyanate composition commercially available from Ashland Chemical under the trade designation Isocure ® II 606 containing, about 73% by weight of polymethylene polyphenyl isocyanate such as Mondur MR from Mobay, and about 27% by weight of a solvent mixture of kerosene and an aromatic solvent for about 2 minutes. The resulting foundry mix is forced into a core box by blowing. It is then contacted with a 12% by volume mix of dimethylethylamine in $CO_2$ at 40 psi for 1 second, followed by purging with air that is at 60 psi for about 4 seconds, thereby forming AFS tensile strength samples (dog bones) using the standard procedure. The composition exhibits a bench life of at least 5 hours.

The cured samples are tested for tensile strength. The average immediate tensile strength after the composition is aged for 5 hours before curing is about 84 psi and after 24 hours at relative humidity of 50% and 25° C. is about 155 psi.

The average immediate tensile strength with no aging of the composition before curing is about 131 psi, after 1 hour at relative humidity of 50% and 25° C. is about 191 psi, and after 24 hours at relative humidity of 50% and 25° C. is about 237 psi.

The average immediate tensile strength after the composition is aged for 3 hours before curing is about 94 psi and after 24 hours under ambient conditions of 50% relative humidity and 25° C. is about 171 psi.

COMPARISON EXAMPLE 2

Example 1 is repeated, except that no bench life extender is employed.

The average immediate tensile strength after the composition is aged for about 5 hours before curing is about 49 psi and after 24 hours under ambient conditions of 50% relative humidity and 25° C. is about 88 psi.

The average immediate tensile strength with no aging of the composition before curing is abou 127 psi, after 1 hour under ambient conditions of 50% relative humidity and 25° C. is about 181 psi, and after 24 hours under ambient conditions of 50% relative humidity and 25° C. is about 260 psi.

The average immediate tensile strength after the composition is aged for about 3 hours before curing is about 68 psi and after 24 hours under ambient conditions of 50% relative humidity and 25° C. is about 129 psi.

EXAMPLE 3

The procedure of Example 1 is repeated, except that the amount of monophenyldichlorophosphate employed is about 0.004 parts by weight, the phenolic component contains about 58% by weight of the phenolic resole benzylic ether resin and 42% by weight of a solvent portion of aromatic hydrocarbon ester, release agent, and silane; and the isocyanate composition contains about 78% by weight of the polyisocyanate and about 22% by weight of a solvent mixture of aromatic hydrocarbon and kerosene.

The average immediate tensile strength after the composition is aged for 5 hours before curing is about 96 psi and after 24 hours under ambient conditions of 50% relative humidity and 25° C. is abou 175 psi.

The average immediate tensile strength with no aging of the composition before curing is about 159 psi, after 1 hour under ambient conditions of 50% relative humidity and 25° C. is about 229 psi, and after 24 hours under ambient conditions of 50% relative humidity and 25° C. is about 283 psi.

The average immediate tensile strength after the composition is aged for 3 hours before curing is about 115 psi and after 24 hours under ambient conditions of 50% relative humidity and 25° C. is about 193 psi.

COMPARISON EXAMPLE 4

Example 3 is repeated, except that no bench life extender is employed.

The average immediate tensile strength after the composition is aged for about 5 hours before curing is about 47 psi and after 24 hours under ambient conditions of 50% relative humidity and 25° C. is about 88 psi.

The average immediate tensile strength after the composition is aged for 3 hours before curing is about 73 psi and after 24 hours under ambient conditions of 50% relative humidity and 25° C. is about 131 psi.

EXAMPLE 5

The procedure of Example 3 is repeated, except that about 0.0216 parts by weight of diphenylmonochlorophosphate are employed as the bench life extender.

The average immediate tensile strength after the composition is aged for 5 hours before curing is about 68 psi and after 24 hours under ambient conditions of 50% relative humidity and 25° C. is about 119 psi.

The average immediate tensile strength after the composition with no aging of the composition before curing is about 169 psi and after 24 hours under ambient conditions of 50% relative humidity and 25° C. is about 258 psi.

COMPARISON EXAMPLE 6

Example 5 is repeated, except that no bench life extender is employed.

The average immediate tensile strength after the composition is aged for 5 hours before curing is about 40 psi and after 24 hours under ambient conditions of 50% relative humidity and 25° C. is about 69 psi.

The average immediate tensile strength after the composition with no aging of the composition before curing is about 163 psi and after 24 hours under ambient conditions of 50% relative humidity and 25° C. is about 258 psi.

EXAMPLE 7

Example 3 is repeated, except that the bench life extender employed is abou 0.025 parts by weight of

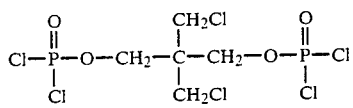

added as a 45% solution in chlorobenzene.

The average immediate tensile strength of the composition is aged for about 5 hours before curing, is about 131 psi, and after 24 hours under ambient conditions of 50% relative humidity and 25° C. is about 198 psi.

The average immediate tensile strength after the composition is aged for about 3 hours before curing is about 151 psi and after 24 hours under ambient conditions of 50% relative humidity and 25° C. is about 212 psi.

The average immediate tensile strength with no aging of the composition before curing is about 162 psi, after 1 hour under ambient conditions of 50% relative humidity and 25° C. is about 197 psi, and after 24 hours under ambient conditions of 50% relative humidity and 25° C. is about 252 psi.

COMPARISON EXAMPLE 8

Example 7 is repeated, except that no bench life extender is employed.

The average immediate tensile strength after the composition is aged for about 5 hours is not determined since the composition is not flowable.

The average immediate tensile strength after the composition is aged for about 3 hours before curing is about 74 psi and after 24 hours under ambient conditions of 50% humidity and 25° C. is about 120 psi.

The average immediate tensile strength with no aging of the composition before curing is about 166 psi, after 1 hour under ambient conditions of 50% relative humidity and 25° C. is about 229 psi, and after 24 hours under ambient conditions of 50% relative humidity and 25° C. is about 248 psi.

A comparison of Examples 1, 3, 5, and 7 with Examples 2, 4, 6, and 8, respectively, clearly demonstrates the effectiveness of the organohalophosphates as bench life extenders.

Examples 1, 3, 5, and 7 each contain a bench life extender employed according to the present invention, whereas Examples 2, 4, 6, and 8 do not include a bench life extender. The results demonstrates that although the tensile strength values for compositions with and without bench life extenders are not significantly different when the compositions are cured without aging, the tensile strengths for compositions with the organohalophosphate are significantly greater than those for compositions without the phosphate when the compositions are aged before curing as normally is experienced in commercial use.

Having thus described our invention, what we claim as new and desire to secure by Letters Patent is:

1. A binder composition comprising in admixture a resin component, a hardener component, and an organohalophosphate, wherein at least one halo group is directly attached to the phosphorus, said resin component including a non-aqueous phenolic resin and said hardener component comprising a polyisocyanate containing at least two isocyanate groups.

2. The composition of claim 1 wherein said organohalophosphate is represented by the formulas:

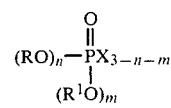

when n is 0 or 1; m is 0 or 1; provided that at least one of n or m is 1, and n+m is 1 or 2; each R and $R^1$ individually is alkyl, aralkyl, aryl, or alkaryl or are interconnected with each other to form an arylene group, an alkylene group, or a cycloalkylene group; and X is a halogen;

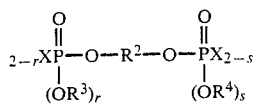

wherein r is 0 or 1; s is 0 or 1; each $R^3$ and $R^4$ individually is alkyl, aralkyl, aryl, or alkaryl; $R^2$ is alkylene, alkylidene, cycloalkylene, or arylene; and X is halogen.

3. The composition of claim 1 wherein said organohalophosphate include a member selected from the group of monophenyldichlorophosphate; diphenylmonochlorophosphate; ethyldichlorophosphate; 2-chlorophenyldichlorophosphate; 4-chlorophenyldichlorophosphate; and 2,2,2-tribromoethyldichlorophosphate.

4. The composition of claim 1 wherein said organohalophosphate contains monophenyldichlorophosphate.

5. The composition of claim 1 wherein said organohalophosphate contains diphenylmonochlorophosphate.

6. The composition of claim 1 wherein said organohalophosphate is represented by the formula:

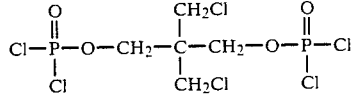

7. The composition of claim 1 wherein said organohalophosphate is employed in amounts of about 0.05% to about 5% by weight of the composition.

8. The composition of claim 1 wherein said organohalophosphate is employed in amounts of about 0.01% to about 5% by weight of the composition.

9. A molding composition which comprises:

(a) a major amount of aggregate; and (b) an effective bonding amount up to about 40% by weight of the aggregate of the binder composition of claim 1.

10. The composition of claim 9 wherein the amount of said binder composition is about 0.6% to about 5% based upon the weight of the aggregate.

11. The composition of claim 1 wherein said curing agent is amine vapor or aerosol.

12. The composition of claim 9 wherein said aggregate is sand.

13. The composition of claim 10 wherein said aggregate is sand.

* * * * *